(12) United States Patent
Reynolds et al.

(10) Patent No.: US 8,065,372 B2
(45) Date of Patent: Nov. 22, 2011

(54) PUBLISH/SUBSCRIBE MESSAGING

(75) Inventors: Andrew David Reynolds, Southampton (GB); Christopher Edward Sharp, Winchester (GB); Andrew James Stanford-Clark, Isle of Wight (GB)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/194,026

(22) Filed: Aug. 19, 2008

(65) Prior Publication Data

US 2009/0019124 A1    Jan. 15, 2009

Related U.S. Application Data

(63) Continuation of application No. 10/547,724, filed on Sep. 1, 2005, now Pat. No. 7,437,417.

(30) Foreign Application Priority Data

Mar. 6, 2003 (GB) .................................. 0305066.3

(51) Int. Cl.
*G06F 15/16* (2006.01)
(52) U.S. Cl. ....................................... 709/206; 709/202
(58) Field of Classification Search .................. 709/202, 709/206
See application file for complete search history.

(56) References Cited

U.S. PATENT DOCUMENTS

| | | | |
|---|---|---|---|
| 6,021,443 A | 2/2000 | Bracho et al. | |
| 6,405,266 B1 | 6/2002 | Bass et al. | |
| 6,549,956 B1 | 4/2003 | Bass et al. | |
| 6,633,630 B1 | 10/2003 | Owens et al. | |
| 6,721,779 B1 * | 4/2004 | Maffeis | 709/202 |
| 6,801,936 B1 * | 10/2004 | Diwan | 709/219 |
| 6,877,023 B1 | 4/2005 | Maffeis et al. | |
| 6,883,014 B1 * | 4/2005 | McErlean | 709/202 |
| 7,152,094 B1 * | 12/2006 | Jannu et al. | 709/206 |
| 7,603,415 B1 * | 10/2009 | McErlean | 709/206 |
| 2003/0033283 A1 | 2/2003 | Evans et al. | |
| 2003/0135556 A1 | 7/2003 | Holdsworth | |
| 2005/0114884 A1 * | 5/2005 | Diwan | 725/34 |

FOREIGN PATENT DOCUMENTS

| | | |
|---|---|---|
| JP | 2000-298590 | 10/2000 |
| JP | 2001-285287 | 10/2001 |
| WO | WO 02/05507 A2 | 1/2002 |
| WO | 03/017562 | 2/2003 |

OTHER PUBLICATIONS

"Linking Instant Messaging to publich/subscribe messaging", IBM Research Disclosure; Kenneth Mason Publications, Hampshire GB, vol. 438, No. 166, Oct. 2000, 4 pages.

* cited by examiner

*Primary Examiner* — Ario Etienne
*Assistant Examiner* — Michael C Lai
(74) *Attorney, Agent, or Firm* — Stephen R. Tkacs; Stephen J. Walkder, Jr.; David A. Mims, Jr.

(57) ABSTRACT

The invention relates to a message brokering system for connecting a client in a local publish/subscribe messaging system to a remote message broker. The system comprises a message broker in said local publish/subscribe messaging system and a metabroker application means representing said remote message broker. The local message broker comprises publish/subscribe means for proxying messages between the client and the metabroker application means. The metabroker application means comprises publish/subscribe means for proxying messages between the local broker and the remote broker.

12 Claims, 1 Drawing Sheet

PUBLISH/SUBSCRIBE MESSAGING

Figure 1:
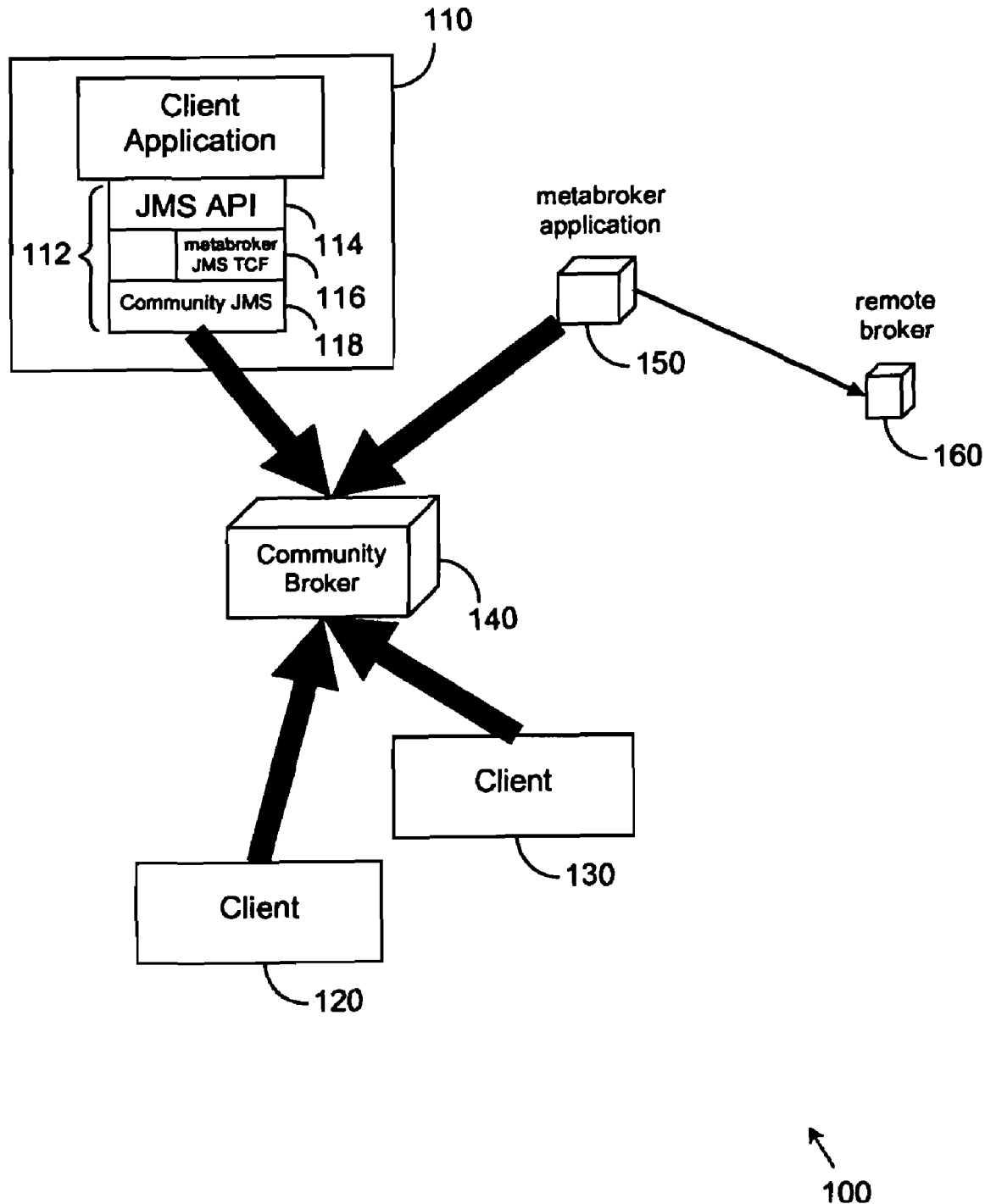

This application is a continuation of application Ser. No. 10/547,724, filed Sep. 1, 2005, now U.S. Pat. No. 7,437,417.

FIELD OF THE INVENTION

This invention relates to publish/subscribe (pub/sub) messaging systems.

BACKGROUND OF THE INVENTION

Publish and Subscribe is an effective way of disseminating information to multiple users. Publish/Subscribe (pub/sub) applications can help to enormously simplify the task of getting business messages and transactions to a wide, dynamic and potentially large audience in a timely manner.

In the field of this invention it is known that pub/sub applications are typically written so that a "community" of clients with a common purpose all connect in to a particular broker, to enable them to send and receive messages amongst themselves. An obvious example is producer/consumer applications, where one set of clients produce data and another set consume that data. Another example is in online gaming, where individual clients connect into a central "hub" to gain access to common services like billing, game updates, high-scores, etc.

However, a problem with this arrangement is that the pub/sub architecture is "static": things become difficult if one of the clients needs to get access to some data which is being published to a different broker somewhere else in the world, for example, if it only occasionally needs to go to update some data table (e.g., average rainfall in some city over a year), or perhaps if an online gaming client needs to report a bug to the game manufacturer, or publish a new high 'high score' for global recognition.

On the World Wide Web, a user can easily 'jump off' the 'current' web server and go to a different one, simply by following a hyperlink. With Web Services, a user can look up the connection information for a service that the user wishes to make use of. However, heretofore, such alternate sourcing of information has not been possible for pub/sub.

It is possible for a client to disconnect from its "current" broker, and reconnect to a different one, but that assumes that all clients have "external" connectivity to allow them to reach the remote brokers, and in the closed world of (say) an online gaming system, that is often not the case (and there are reasons such as security why the clients should not be given such "general" access). So the problem to be solved is gaining pub/sub access to a remote broker given the restricted environment of a closed community pub/sub system.

A need therefore exists for users of a closed pub/sub community, connected to a central broker facility, to be able to exchange pub/sub messages with other, remote brokers, without gaining a direct connection to those brokers, wherein the abovementioned disadvantage(s) may be alleviated.

SUMMARY

In accordance with one illustrative embodiment, a message brokering system connects a client in a local publish/subscribe messaging system to a remote message broker. The message brokering system comprises a processor and a storage medium storing a metabroker application for representing the remote message broker. The metabroker application is a client of a community broker that is local to a plurality of clients and comprising a publish/subscribe system for proxying messages between the plurality of clients and the remote message broker. The metabroker application, when executed by the processor, causes the processor to receive a message, originating at a given client within the plurality of clients and destined for the remote message broker, by subscribing to the community broker in order to receive messages addressed to the remote message broker, and forward the received message to the remote message broker. The metabroker application, when executed by the processor, causes the processor to publish a message received from the remote message broker to the community broker. Publishing the message received from the remote message broker to the community broker comprises indicating that the message is destined for a subset of clients within the plurality of clients having subscribed to receive messages from the remote message broker and enabling the subset of clients to subscribe to the community broker to receive messages from the remote message broker.

In accordance with another illustrative embodiment, a computer program product comprises a computer readable storage medium having a computer readable program stored thereon. The computer readable program, when executed on a computing device, causes the computing device to connect a client in a local publish/subscribe messaging system to a remote message broker. A metabroker application is a client of a community broker that is local to a plurality of clients and represents said remote broker. The computer readable program comprises computer instructions for using a publish/subscribe messaging system to proxy messages received at the metabroker application between the plurality of clients and the remote message broker. Proxying messages between the plurality of clients and the remote message broker comprises receiving a message, originating at a given client within the plurality of clients and destined for the remote message broker, by subscribing to the community broker in order to receive such messages, and forwarding the received message to the remote message broker. Proxying messages between the plurality of clients and the remote message broker further comprises publishing a message received from the remote message broker to the community broker using a topic designated as a topic for remote broker messages, thereby enabling a subset of clients within the plurality of clients to subscribe to the topic at the community broker in order to receive messages from the remote message broker.

BRIEF DESCRIPTION OF THE DRAWING(S)

One heterogeneous multi-broker proxying on demand system with message broker web services, incorporating a preferred embodiment of the present invention will now be described, by way of example only, with reference to the accompanying drawing(s), in which:

FIG. 1 shows a block schematic diagram of a publish system incorporating a preferred embodiment of the present invention.

DESCRIPTION OF PREFERRED EMBODIMENT

Referring to FIG. 1, a pub/sub messaging system 100 has a number of pub/sub clients (three of which, 110, 120 and 130 are shown) are each connected to their local "community" broker 140. A "metabroker" application 150 is also a client to the "community" broker 140, and is permanently connected and subscribes to the wildcard topic "metabroker/#", (where '#' is the topic wildcard symbol), so that it receives all messages that have topics prefixed with the name "metabroker", e.g.: metabroker/a/b.

When a client application wishes to gain access to a remote broker 160, it requests a connection to the "metabroker" Java™ Message Service (JMS) service (Java and all Java-based trademarks are trademarks or registered trademarks of Sun Microsystems, Inc. in the United States, other countries, or both.)

This JMS service is in practice a software library 112 (comprising a JMS API—Application Programming Interface—114, a metabroker JMS TopicConnectionFactory (TCF) 116 and a community JMS TCF 118) running on the client, which gives the client application the impression that it is making a connection to a remote broker, but is in fact making use of the "normal" (existing) connection to the community broker 140 to send special messages to the metabroker 150, by publishing messages to the community broker 140 which the metabroker 150 receives as a subscriber. The metabroker 150, in turn, connects to the required remote broker 160 and proxies messages back and forth to the client application 110, all via pub/sub through the community broker 140. In effect, this may considered as "pub/sub over pub/sub".

When creating the JMS connection object, the client application passes as parameters an identifier for the remote broker service the user wishes to make use of. This might be explicit, as an IP address and port, or a domain name and port, or it might be a "service name", which would be treated as a Web Service service name, and a UDDI lookup is performed to resolve the connection information for that broker service. It will be understood that there are a number of ways of mapping from "service names" to physical connection details, UDDI being simply an example.

The JMS implementation for the metabroker service uses the existing connection to the community broker 140 to which the client is usually attached to flow messages to and from the metabroker application. This might be through a JMS interface, or some other messaging capability which supports a publish/subscribe messaging model.

Below there is described one possible implementation of topics and message structures which could be used to implement a pub/sub messaging model, through the metabroker application, through a pub/sub messaging system. In the following description it is assumed that message bodies would use a suitably structured data representation, e.g. XML, or name/value pairs. When the action of the client is described, it is to be understood that this is the client-side implementation of the metabroker JMS service, typically implemented as a library which the client application accesses. The action of the metabroker application is explained where needed for clarification. The client application will simply make the usual JMS API calls to publish and subscribe to data on the remote broker to which it is logically attached, unaware of the proxying via the community broker which is happening in the JMS library layer (i.e. 112 in the FIGURE).

In other words, the client application already knows how to reach the community broker (or knows which directory to ask for instructions on how to connect—e.g. Java Naming and Directory Interface lookup). The community broker communicates with the metabroker application using publish/subscribe and the meta broker application makes the connection to the remote broker.

Connect
────────

In response to a "connect" request from the application, the client sends:
topic: metabroker/request/connect
message:
    identification information of remote broker to which metabroker is to connect on behalf of this client (could be an IP address and port, or a Web Services service name, which the metabroker would resolve to an IP address and port using a UDDI directory enquiry)
    possible authentication information (e.g. user ID, password)
    client unique identifier (for temporary use) (client UID)
the client subscribes to
topic: metabroker/response/{client UID}/connack Upon successful address resolution and connection to the remote broker, the metabroker application publishes a message to the community broker:
topic: metabroker/response/{client UID}/connack
message:
    result code, indicating whether the connection to the remote broker by the metabroker application was successful
    session identifier (session ID)

Assuming a successful connection (indicated by the return code), the client un-subscribes in the community broker from:
metabroker/response/{client UID}/connack
and subscribes in the community broker to:
metabroker/response/{session ID}/#
(i.e., any topic which starts with metabroker/response/{session ID}/)

The client receives the response message from the metabroker (due to its subscription), and is able to notify the application of the outcome of the request through the appropriate JMS return code.

Publish
────────

In response to a "publish" request from the application, the client sends:
topic: metabroker/request/{sessionID}/publish
message:
    topic passed from application
    message body passed from application
    quality of service/persistence delivery instruction flags
    client message identifier (message ID)

When the message has been successfully published by the metabroker application to the remote broker, the metabroker publishes a message to the community broker:
topic: metabroker/response/{session ID}/puback
message:
    message ID
    possibly a result code The client receives this message (due to its subscription), and is able to notify the application of the outcome of the request through the appropriate JMS return code.

Subscribe
────────

In response to a "subscribe" request from the application, the client sends
topic: metabroker/request/{session ID}/subscribe
message:
    topic(s) requested by application
    other subscription flags (e.g., quality of service, durability)
    client message ID (message ID)

The metabroker receives this message and subscribes to the requested topic(s) on behalf of the client.

When the remote subscription is acknowledged, the metabroker publishes a message to the community broker:
topic: metabroker/response/{session ID}/suback
message:
    message ID
    subscription confirmation result code The client receives this message (due to its subscription), and is able to notify the application of the outcome of the request through the appropriate JMS return code.

Unsubscribe

UNSUBSCRIBE is implemented in a similar same way to SUBSCRIBE, and need not be described further.

Incoming Publication

When the metabroker receives a message from the remote broker, which is destined for one of the community broker clients that has a remote broker session through the metabroker application, it determines (using a lookup table, and possibly a publication "matching engine", not shown) which client this message is for, and publishes a message to the community broker:

topic: metabroker/response/{session ID}/publish
message:
   topic
   message body The client application receives the message and invokes the appropriate mechanism to notify the application that an incoming message has been received which matches the subscription that was placed earlier.

Note, the remote broker sends a copy of a publication message to each client that has registered an interest (subscribed). The metabroker application is one such subscribe and has subscribed on behalf of its clients, based on their "subscribe" request(s) via the community broker.

Some brokers (or rather some connection protocols) allow messages to be held for a subscriber even if they're not actually connected at that time. Thus the metabroker might (if it was using such a protocol) subscribe to some topics on behalf of one of its clients, and then get disconnected, and come back later to the broker and collect the messages that match its subscription, and then can forward them to its clients. IBM's WebSphere MQ is one such protocol. Such subscriptions are known as "durable subscriptions", i.e. they "last" even when the client disconnects, and they have to be explicitly cancelled (unsubscribed) when no longer required.

Disconnect

When the client requests a disconnection from the remote broker, the client libraries publish the message:
topic: metabroker/request/{session ID}/disconnect After disconnecting from the remote broker, the metabroker publishes a message to the community broker:
topic: metabroker/response/{session ID}/discack The client receives this message (due to its subscription), and is able to notify the application of the outcome of the request through the appropriate JMS return code.

The client then unsubscribes in the community broker from: metabroker/response/{session ID}/#

It will be understood that the heterogeneous multi-broker proxying on demand system with message broker web services described above provides the following advantages:

Clients connected to the "community" broker can gain access to a remote pub/sub broker, without needing a direct network connection to it, by making use of its single, existing connection to the "community" broker.

Several clients connected to the "community" broker can make use of a single connection from the "metabroker" to the remote broker, which is useful if there are scalability, connectivity, or firewall issues—they can be dealt with by the metabroker on behalf of all the clients.

The remote broker service may be described and advertised through Web Services mechanisms such as WSDL, UDDI, etc., which gives a convenient way of locating and finding out how to establish a connection to the remote brokers.

It will be appreciated that the method described above for publish/subscribe messaging may be carried out in software running on a processor (not shown), and that the software may be provided as a computer program element carried on any suitable data carrier (also not shown) such as a magnetic or optical computer disc.

In summary, it will be understood that the heterogeneous multi-broker proxying on demand system with message broker web services described above provides the advantage that clients connected to a "community" broker can gain access to a remote pub/sub broker, without needing a direct network connection to it, by making use of its single, existing connection to the "community" broker. Also, several clients connected to a "community" broker can make use of a single connection from the "metabroker" to the remote broker, which is useful if there are scalability, connectivity, or firewall issues—they can be dealt with by the metabroker on behalf of all the clients. The remote broker service may be described and advertised through Web Services mechanisms such as WSDL, UDDI, etc., which gives a convenient way of locating and finding out how to establish a connection to the remote broker(s).

The invention claimed is:

1. A message brokering system for connecting a client in a local publish/subscribe messaging system to a remote message broker, the message brokering system comprising:
   a processor; and
   a storage medium storing a metabroker application for representing the remote message broker, the metabroker application being a client of a community broker that is local to a plurality of clients and comprising a publish/subscribe system for proxying messages between the plurality of clients and the remote message broker, wherein the metabroker application, when executed by the processor, causes the processor to:
      receive a message, originating at a given client within the plurality of clients and destined for the remote message broker, by subscribing to the community broker in order to receive messages addressed to the remote message broker, and forward the received message to the remote message broker; and
      publish a message received from the remote message broker to the community broker, wherein publishing the message received from the remote message broker to the community broker comprises indicating that the message is destined for a subset of clients within the plurality of clients having subscribed to receive messages from the remote message broker and enabling the subset of clients to subscribe to the community broker to receive messages from the remote message broker,
   wherein each of the plurality of clients has a software library that converts messages intended for the remote message broker to special messages to the community broker and wherein the metabroker application receives the special messages as a subscriber of the community broker.

2. The message brokering system of claim 1, wherein the metabroker application further causes the processor to:
   receive a subscription request from the given client, said subscription request indicating information that the given client would like to receive from the remote message broker, wherein the metabroker application is configured to subscribe to receive the information from the remote message broker.

3. The message brokering system of claim 2, wherein the metabroker application further causes the processor to:
    forward messages from the remote message broker to the given client in accordance with the given client's subscription request.

4. The message brokering system of claim 1, wherein the software library publishes the special messages to one or more metabroker wildcard topics and wherein the metabroker application subscribes to receive messages published to the one or more metabroker wildcard topics.

5. The message brokering system of claim 4, wherein the metabroker application publishes messages to the one or more metabroker wildcard topics and wherein the software library receives the messages published to the one or more metabroker wildcard topics by the metabroker application.

6. The message brokering system of claim 1, wherein a given message within the special messages is a connection request, a publish request, a subscribe request, an unsubscribe request, or a disconnect request.

7. A computer program product comprising a computer readable storage device having a computer readable program stored thereon, wherein the computer readable program, when executed on a computing device, causes the computing device to connect a client in a local publish/subscribe messaging system to a remote message broker, wherein a metabroker application is a client of a community broker that is local to a plurality of clients and represents said remote message broker, wherein the computer readable program comprises:
    computer instructions for using a publish/subscribe messaging system to proxy messages received at the metabroker application between the plurality of clients and the remote message broker, wherein proxying messages between the plurality of clients and the remote message broker comprises:
        receiving a message, originating at a given client within the plurality of clients and destined for the remote message broker, by subscribing to the community broker in order to receive such messages, and forwarding the received message to the remote message broker; and
        publishing a message received from the remote message broker to the community broker using a topic designated as a topic for remote broker messages, thereby enabling a subset of clients within the plurality of clients to subscribe to the topic at the community broker in order to receive messages from the remote message broker,
    wherein each of the plurality of clients has a software library that converts messages intended for the remote message broker to special messages to the community broker and wherein the metabroker application receives the special messages as a subscriber of the community broker.

8. The computer program product of claim 7, wherein proxying messages between the plurality of clients and the remote message broker further comprises:
    receiving a subscription request from the given client, said subscription request indicating information that the given client would like to receive from the remote message broker; and
    the metabroker application subscribing to receive the information from the remote message broker on behalf of the given client.

9. The computer program product of claim 8, wherein proxying messages between the plurality of clients and the remote message broker further comprises:
    forwarding messages from the remote message broker to the given client in accordance with the given client's subscription request.

10. The computer program product of claim 7, wherein the software library publishes the special messages to one or more metabroker wildcard topics and wherein the metabroker application subscribes to receive messages published to the one or more metabroker wildcard topics.

11. The computer program product of claim 10, wherein the metabroker application publishes messages to the one or more metabroker wildcard topics and wherein the software library receives the messages published to the one or more metabroker wildcard topics by the metabroker application.

12. The computer program product of claim 7, wherein a given message within the special messages is a connection request, a publish request, a subscribe request, an unsubscribe request, or a disconnect request.

* * * * *